United States Patent [19]

Stann et al.

[11] Patent Number: 5,122,803
[45] Date of Patent: Jun. 16, 1992

[54] MOVING TARGET IMAGING SYNTHETIC APERTURE RADAR

[75] Inventors: Barry L. Stann, Silver Spring; Peter Alexander, Rockville, both of Md.

[73] Assignee: The United States of America as represented by the Secretary of the Army, Washington, D.C.

[21] Appl. No.: 788,699

[22] Filed: Nov. 6, 1991

[51] Int. Cl.$^5$ .............................................. G01S 13/90
[52] U.S. Cl. ..................................... 342/25; 342/196
[58] Field of Search .................................... 342/25, 196

[56] References Cited

U.S. PATENT DOCUMENTS

| | | | |
|---|---|---|---|
| 3,975,734 | 8/1976 | Payne | 342/25 |
| 4,086,590 | 4/1978 | Goggins, Jr. | 342/25 |
| 4,551,724 | 11/1985 | Goldstein et al. | 342/25 |
| 4,825,213 | 4/1989 | Smrek | 342/25 |

OTHER PUBLICATIONS

Brown et al., "Range Doppler Imaging with Motion through Resolution Cells," IEEE Transactions on Aerospace and Electronic Systems, AES, No. 1, Jan. 1969, pp. 85-105.
Brown et al., "an Introduction to Synthetic Aperture Radar," IEEE Spectrum, vol. 6, No. 9, Sep. 1969.

(List continued on next page.)

Primary Examiner—John B. Sotomayor
Attorney, Agent, or Firm—Saul Elbaum; Guy M. Miller; Jason M. Shapiro

[57] ABSTRACT

A method and apparatus of imaging moving targets with an aircraft mounted complex radar system has a plurality of independent, but synchronized synthetic aperture radars (SARs) positioned on the aircraft at equal separation distance $\Delta x$ along the flight velocity vector $V_p$ of the aircraft. Frequency modulated (or otherwise coded) pulses are transmitted therefrom with an interpulse period $T_p$, where $1/T_p$ is an integral multiple of $V_p/\Delta x$. The pulse repetition frequency, platform velocity, and spacing between adjacent SARs are all chosen to create the effect of a stationary radar momentarily fixed in space. A two dimensional complex IF (intermediate frequency) output signal is recovered by the first SAR on the aircraft. This signal is identical to that recovered by a conventional SAR. The two dimensions are fast time and downtract position. If only one point target is present, the IF output signal is the point target's phase history. Typically, many point targets are simultaneously present, and the IF output signal is the sum of point target phase histories. Each additional SAR on the platform recovers a different two dimensional complex IF output signal. These signals are sequentially stacked to form a three dimensional complex data set. The stacking dimension is called subaperture time, and is unique to this invention. A two dimensional cut through the three dimensional complex data set and normal to the downtract position dimension, say at downtrack position x, contains the data which would be collected by a stationary radar at downtrack position x. This radar would transmit a total of M frequency modulated (or otherwise coded) pulses, where M is the number of SARs on the aircraft, at a rate of one pulse every $\Delta x/V_p$ seconds, as it observes all targets. For each target present, a slow doppler fluctuation, whose frequency is directly proportional to target slow relative velocity, appears along the subaperture time axis. Target slow relative velocity is the target velocity with respect to the fixed radar in space. Subaperture time and slow relative velocity are a Fourier transform pair. Consequently, targets, in terms of phase history, are easily separated into M distinct slow relative velocity planes or gates, by merely taking the discrete Fourier transform of the three dimensional complex data set with respect to subaperture time. For a given slow relative velocity plane, a target phase history, therein, is transformed and compressed into an image by using matched filtering techniques adjusted for target crosstrack and downtrack velocity components. The resulting image is highly resolved spatially, and appears in the image plane which best estimates the target's crosstrack and downtrack velocity components.

14 Claims, 12 Drawing Sheets

OTHER PUBLICATIONS

Brown, "Synthetic Aperture Radar," IEEE Transactions on Aerospace and Electronic Systems, AES-3, No. 2, 1967, pp. 217-229.

Tomiyasu, K., "Tutorial Review of Synthetic Aperture Radar (SAR) with Applications to imaging of the Ocean Surface," Proc. IEEE, vol. 66, No. 5, May 1978, pp. 563-583.

Ouchi, K., "On the Multilook Images of Moving Targets by Synthetic Aperture Radars," IEEE Transaction on Antennas and Propogation, vol. AP-33, No. 8, Aug. 1985, pp. 823-827.

Raney, R. K., "Synthetic Aperture Imaging Radar and Moving Targets," IEEE Transactions on Aerospace and Electronic Systems, vol. AES-7, No. 3, May 1971, pp. 499-505.

Freeman, A., "Simple MTI Using Synthetic Aperture Radar," Proc. of IGARRS 1984 Symposium, ESA SP-215, 1984, pp. 65-70.

Freeman et al., "Synthetic Aperture Radar (SAR) Images of Moving Targets," GEC Journal of Research, vol. 5, No. 2, 1987, pp. 106-115.

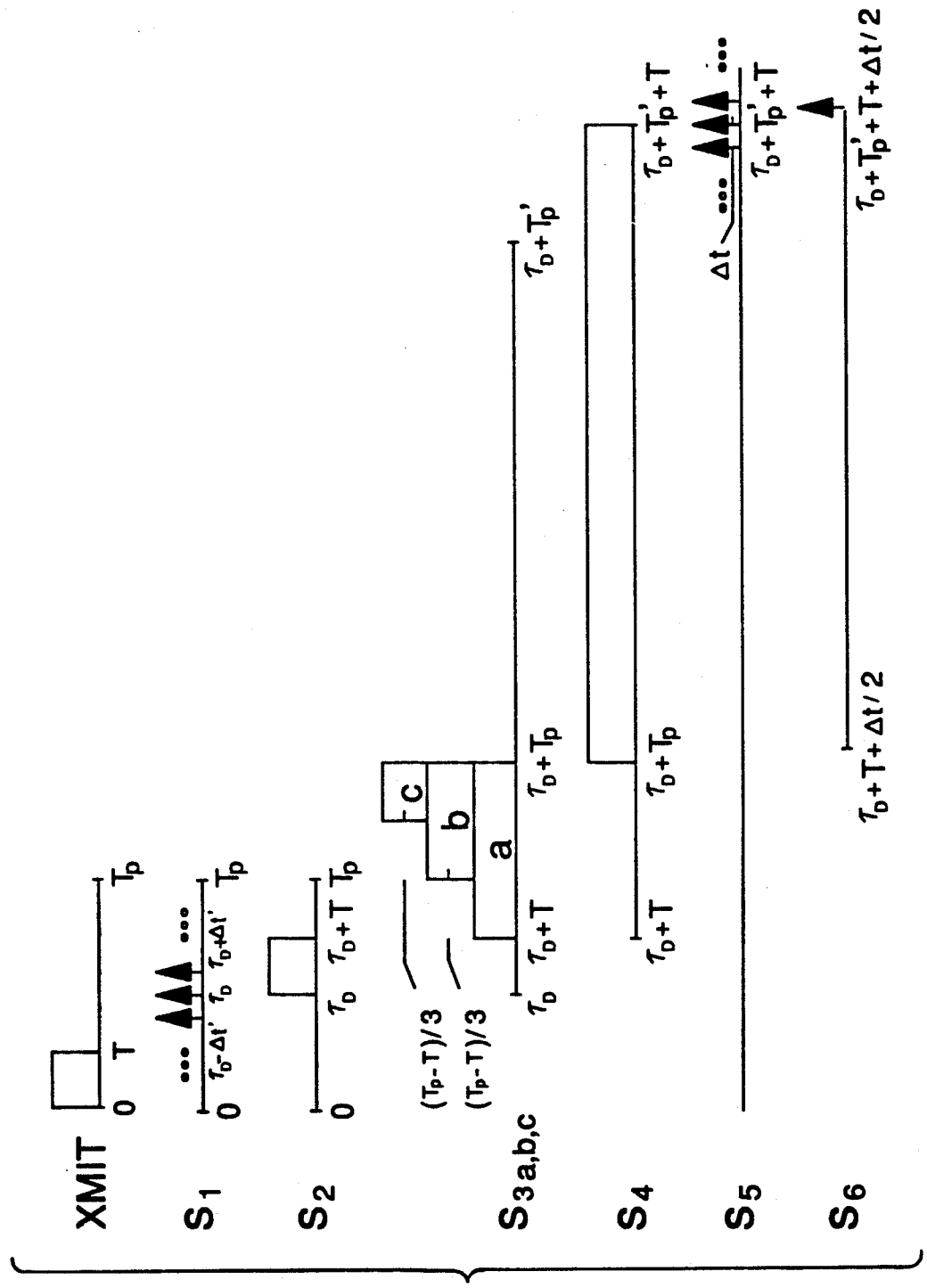

MOVING TARGET IMAGING SYNTHETIC APERTURE RADAR

RIGHTS OF THE GOVERNMENT

The invention described herein may be manufactured, used and licensed by or for the United States Government for Governmental purposes without payment to us of any royalty thereon.

BACKGROUND OF THE INVENTION

1. Field of the Invention

The present invention relates generally to synthetic aperture radar (SAR) and, more particularly, to an apparatus and method of employing a plurality of SARs mounted on an aircraft or moving platform for imaging moving targets and determining their velocity components.

2. Description of the Prior Art

Conventional SAR (synthetic aperture radar) is used for the remote sensing of earth resources in such fields as hydrology, agriculture, forestry, and geology, just to name a few; and for the mapping of rural areas and urban centers. In addition, conventional SAR is used to detect, image, and locate targets within the scene. All of these applications utilize signal processing schemes which require that objects within the scene remain stationary.

The imaging of stationary objects or targets within the scene is accomplished with a synthetic narrow beam antenna, which is created when an airborne SAR flies a long straight line path, called a synthetic aperture. Over this path, the SAR periodically transmits a pulsed frequency modulated signal towards the ground, in the direction transverse to the flight path and at some depression angle with respect to the horizontal, and recovers the back scattered signal from the target using quadrature mixers. The mixer outputs are then combined to form a complex two dimensional IF (intermediate frequency) output signal. This signal is comprised of two orthogonal fluctuations. One fluctuation, called the range fluctuation, occurs in the fast time dimension, and is due to the round trip delay time from the SAR to the target and back. Fast time is the time axis associated with transmitting and receiving a pulse at a downtrack position. The other fluctuation, called the doppler fluctuation, occurs in the downtrack position dimension, and is due to the relative motion of the target with respect to the SAR. Range compression is accomplished by taking the Fourier transform of the IF output signal with respect to fast time. The resulting doppler track is then compressed in the downtrack position dimension by correlating it with the doppler chirp reference for a stationary point target. The image produced is spatially resolved and is centered at the proper range and downtrack position.

When targets are in motion the conventional SAR's ability to perform is either severely degraded or lost. For example, a loss in signal strength, a degradation in image resolution, and an offset in target location can result. Consequently, conventional SAR-based ground surveillance systems are not very effective for monitoring targets in motion.

A literature search was conducted in order to obtain works in the field of moving target imaging. Many excellent papers on conventional SAR were uncovered. The best and most recent works, which examine the problem of imaging moving targets and propose a solution, are two very similar papers by Freeman entitled, "Simple MTI Using Synthetic Aperture Radar," Proc. of IGARSS 1984 Symposium, ESA SP-215, pp. 65-70, and Freeman et al. entitled, "Synthetic Aperture Radar (SAR) Images of Moving Targets," GEC Journal of Research, Vol. 5, No. 2, pp. 106-115. In these papers, the SAR's pulse repetition frequency is made significantly greater than the doppler bandwidth (or clutter band) associated with a conventional SAR, so that moving target returns with doppler frequencies outside the clutter band can be recovered. A bank of doppler filters, each of bandwidth equal to the clutter band, subdivide the doppler frequency domain into non-overlapping doppler bands. Notably, each doppler band corresponds to a different radial velocity band of target motions. The doppler filters are used to sort moving targets in the SAR return according to radial velocity. For a given filter the output is undersampled, so that the filter's band center is aliased onto zero doppler frequency, and the resulting samples are compressed in the downtrack position dimension using the conventional SAR reference. The resulting SAR image spatially resolves moving targets with a downtrack positional uncertainty given by $\pm R_0 \theta/2$ and a radial velocity uncertainty given by $\pm V_p \theta/2$. Here $R_0$ is the target broadside range, $\theta$ is the antenna 3 dB beamwidth, and $V_p$ is the platform velocity. These uncertainties can be quite large. Further, some degradation in spatial resolution is expected, because target downtrack velocity is not compensated for.

SUMMARY OF THE INVENTION

It is therefore an object of the invention to provide a method for imaging moving targets using SAR.

The methods disclosed above can not be used for applications simultaneously requiring high spatial and velocity resolutions, and high positional accuracy. The proposed invention satisfies these requirements. Briefly, an airborne complex radar, employing in effect M independent SARs, which are positioned on the aircraft (platform) in a straight line in the direction of the flight path, and are at equal separation distance $\Delta x$, flies a straight line path as it periodically illuminates the scene below. The SARs are synchronized so that M frequency modulated (or otherwise coded) pulses are simultaneously transmitted from the M SARs. For each SAR, the transmission rate or prf (pulse repetition frequency) is of course the same and is greater than that required to recover the highest expected fast doppler frequency. (The term fast doppler frequency, rather than simply doppler frequency, is used from hereon to identify the doppler frequency associated with target motion relative to the aircraft. Other terms, previously called doppler fluctuation, doppler track, and doppler chirp reference are also from hereon preceeded with the word fast, and relative velocity of the target with respect to the aircraft is simply called fast relative velocity.) The prf, the platform velocity, and the spacing between adjacent SARs are all chosen to create the effect of a stationary radar, momentarily fixed in space. The number of SARs employed, M, is inversely proportional to the required system velocity resolution, $(V_{res})$, the prf is an integral multiple of $V_p/\Delta x$, and the separation distance $\Delta x$ is directly proportional to the aircraft velocity $V_p$. Proceeding further, the first SAR on the platform recovers a two dimensional complex IF output signal, identical to that recovered by a conventional SAR. The two dimensions are fast time and downtrack position. If only one point target is present, the IF output signal is the point target's phase history. In the earlier discussion on conventional SAR (See Description of the Prior Art.) only one point target was considered to be present. Typically, many point targets are simultaneously present and the IF output signal is the sum of point target phase histories. Each additional SAR on the aircraft (platform) recovers a different two dimensional complex IF output signal. These signals are sequentially stacked to form a three dimensional complex data set. The stacking dimension is called subaperture time, and is unique to this invention. A two dimensional cut through the three dimensional complex data set and normal to the downtrack position dimension, say at downtrack position x, contains the data which would be collected by a stationary radar at downtrack position x. This radar would transmit a total of M frequency modulated (or otherwise coded) pulses at a rate of one pulse every $\Delta x/V_p$ seconds, as it observes all targets. For each target present, a slow doppler fluctuation, whose frequency is directly proportional to target slow relative velocity, appears along the subaperture time axis. Target slow relative velocity is the target velocity with respect to the fixed radar in space. Subaperture time and slow relative velocity are a Fourier transform pair. Consequently, targets, in terms of their phase histories, are easily separated into M distinct slow relative velocity planes or gates, by merely taking the discrete Fourier transform of the three dimensional complex data set with respect to subaperture time. Note that slow relative velocity plane resolution ($V_{res}$) is selected to meet the system requirement. For a given slow relative velocity plane, a target phase history, therein, is transformed and compressed into an image by using matched filtering techniques adjusted for target crosstrack and downtrack velocity components. The resulting image is highly resolved spatially and appears in the image plane which best estimates the target's crosstrack and downtrack velocity components. Image downtrack positional uncertainty is approximately $\pm(V_{res}/V_p)R_0$, a small number, crosstrack velocity uncertainty is $\pm V_{res}$, a system input, and ground clutter contamination is found only in the zero velocity pair image plane.

The foregoing and other objects and advantages of the invention will appear from the following description. In the description reference is made to the accompanying drawings which form a part hereof, and in which there is shown by way of illustration and not of limitation a preferred embodiment. Such description does not represent the full extent of the invention, but rather the invention may be employed in different arrangements according to the breadth of the invention.

BRIEF DESCRIPTION OF THE DRAWINGS

FIG. 2b shows fast time axes at downtrack position x according to the single synthetic aperture radar of FIG. 2a.

FIG. 7b shows a continuation of the schematic diagram of an IF processor as shown in FIG. 7a.

FIG. 8 shows a timing diagram for the IF processor shown in FIGS. 7a and 7b.

DESCRIPTION OF THE PREFERRED EMBODIMENTS

The theory of how this system images moving targets is discussed. Specifically, the engagement geometry is shown and the development of the moving target SAR data set, previously called the three dimensional complex data set, is presented. Also presented, is the moving target SAR data set processing involving the Fourier transform and a bank of matched filters. The processing produces velocity and spatially resolved images, one for each target, centered at or near the proper crosstrack and downtrack positions. Further, system design equations are summarized in terms of engagement geometry and system parameters. The system design includes a complex radar and an IF processor. Finally, two preferred embodiments of the system design are shown and discussed.

Theory

Geometry

Figure 1:
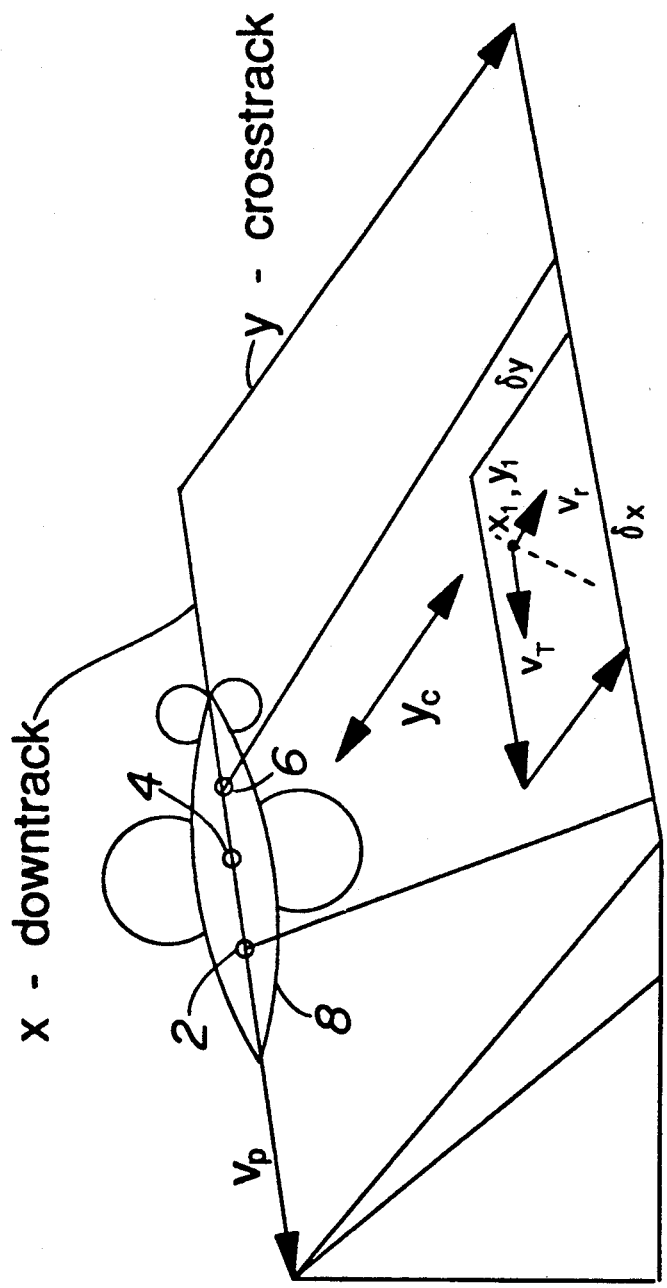
FIG. 1 shows a simple representation of the engagement geometry associated with an aspect of the present invention.

Consider the engagement geometry shown in FIG. 1. The x-axis points in the downtrack direction, while the y-axis points in the crosstrack direction. A number of independent, by synchronized SARs, 2, 4, and 6, are carried aloft by an aircraft 8, which then flies along the x-axis at velocity $V_p$. While three SARs have been shown for ease of explanation, the actual number will be much larger depending on the system velocity resolution desired. The SARs illuminate the ground below and the return signals are processed. To facilitate the analysis the ground patch 10 is assumed to lie in the slant plane defined by the x and y axes. The patch is of width $\delta_y$, length $\delta_x$, and is centered at the crosstrack distance $y_c$. A target whose downtrack velocity is $V_{T1}$ and whose crosstrack velocity is $V_{r1}$ is brought to a focus at the coordinates ($x_1$, $y_1$) associated with it being broadside to the first SAR. The processing also determines $V_{r1}$ and $V_{T1}$. The engagement constraints $y_c >> \delta_y, V_{r1} << V_p$, and $V_{T1} << V_p$ must be satisfied.

Development of Moving Target SAR Data Set

Starting with a single SAR and then generalizing to many SARs, we show how a data set is developed.

Figure 2A:
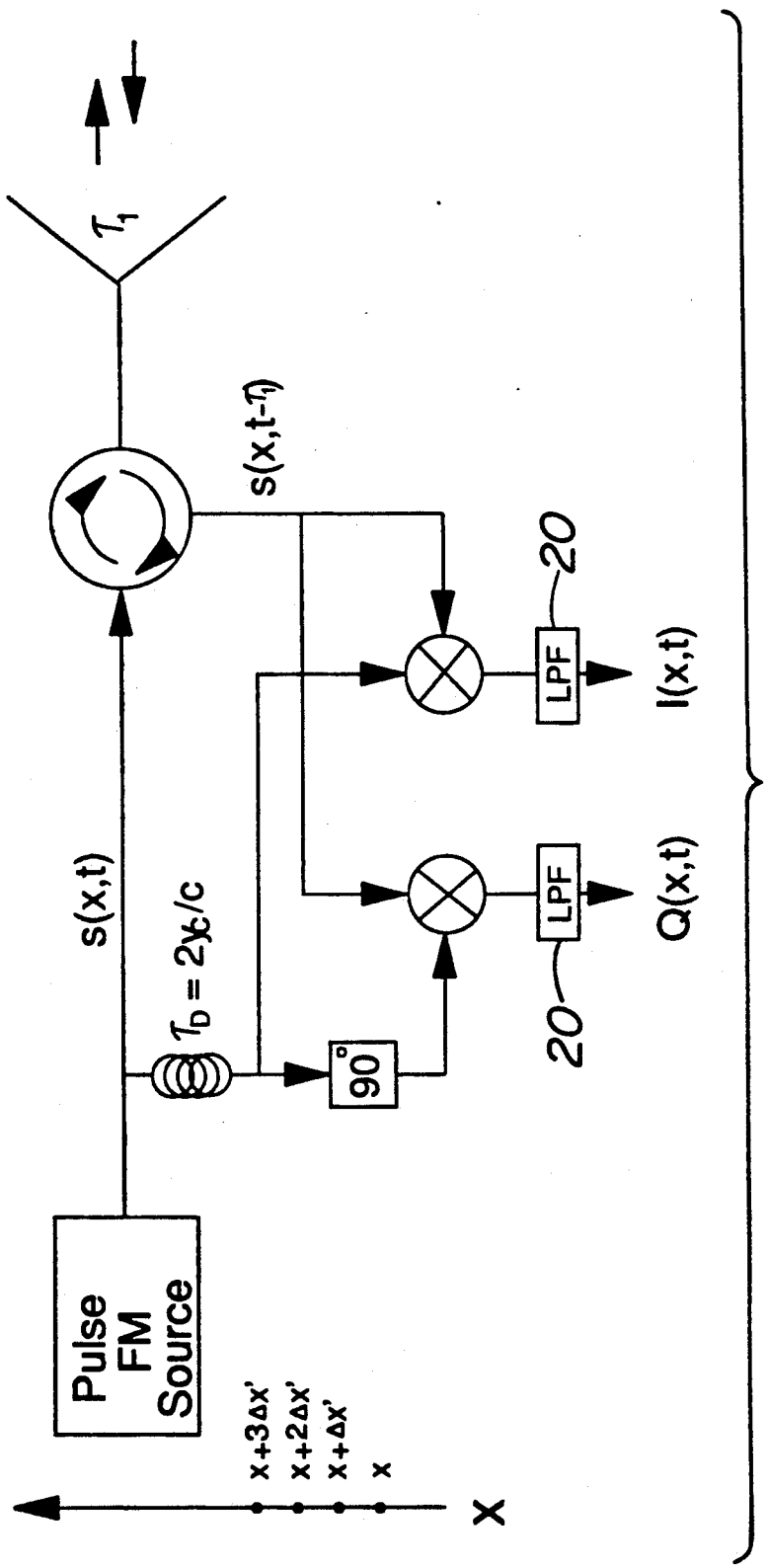
FIG. 2a shows a schematic representation of a synthetic aperture radar.

A single SAR is shown in FIG. 2a (where LPF, 20, stands for low pass filter). The SAR moves quasi-statically along the x-axis, transmitting a frequency modulated T-second wide pulse of rf energy every $\Delta x'$ meters of travel or every $T_p$ seconds. At downtrack position x the transmitted signal is given by $$s(x,t) = \begin{cases} A\cos\left(\omega_0 t + 2\pi\Delta F \int_0^t m(\alpha)d\alpha + \phi_x\right); 0 \leq t < T \\ 0; T \leq t \leq T_p \end{cases}$$

Here, A is the carrier amplitude, $\omega_0$ is the carrier angular frequency, t is fast time, $\Delta F$ is the peak frequency deviation, m(t) is the frequency modulation function, and $\phi_x$ is the initial phase at position x. The pulse transmitted at t=o returns $\tau_1$ seconds later and is mixed with both the in-phase and the quadrature-phase versions of the $\tau_D$ delayed replica of the transmitted pulse. The delay $\tau_D$ is matched to the crosstrack distance $y_c$. Then, the resulting in-phase, I(x,t), and quadrature-phase, Q(x,t), mixer outputs are combined to form a complex waveform $$p(x,t) = I(x,t) + jQ(x,t).$$

This waveform represents the SAR IF output signal at position x.

Figure 2B:
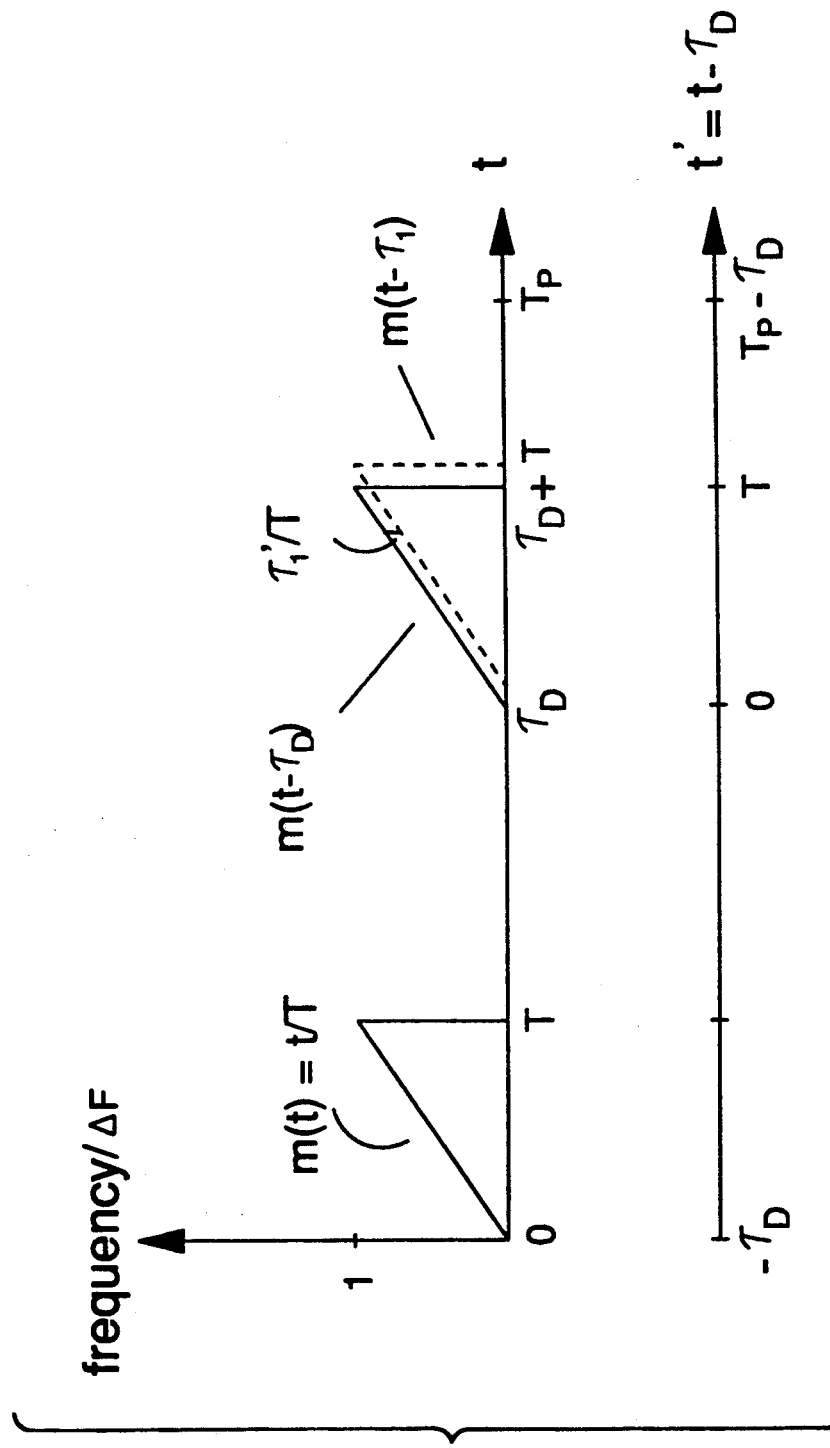

It is convenient to define an adjusted fast time, $$t' = t - \tau_D,$$

and an adjusted time delay, $$\tau'_1 = \tau_1 - \tau_D,$$

so that the IF output signal at position x is non-zero only for $0 \leq t' < T$. In terms of these parameters the IF output signal, for the frequency modulation function in FIG. 2b, can be expressed as $$p(x,t') \sim \begin{cases} e^{j\omega_0 \tau'_1} \cdot e^{j2\pi\Delta F \frac{\tau'_1}{T} t'}; 0 \leq t' < T \\ 0; \text{otherwise} \end{cases}$$

The symbol $\sim$ means that the equation is an idealized approximation to the actual equation.

At position x only adjusted fast time varies, and the first complex term in p(x,t') is constant. The second complex term in p(x,t') is a function of t' and has a frequency, call it $f_{r1}$, which is proportional to adjusted range (r'$_1$). Note that $\tau'_1 = 2r'_1/c$, where c is the speed of light. This second term is the range fluctuation and its frequency is given by $$f_{r1} = \frac{\Delta F \tau'_1}{T} = \frac{1}{T} \frac{r'_1}{res}.$$

Here res is the spatial resolution, res=c/(2$\Delta F$), r$_1$ is the distance from the first SAR to the target, and $$r'_1 = r_1 - y_c = (y_1 - y_c) +$$

-continued $$(x - x_1)\left[\left(\frac{V_{r1}}{V_p}\right) + \left(\frac{1}{2}\right)\left(1 - \frac{V_{T1}}{V_p}\right)^2 \left(\frac{x - x_1}{y_1}\right)\right] -$$

$$\left(\frac{1}{2}\right)\left(\frac{V_{r1}}{V_p}\right)\left(1 - \frac{V_{T1}}{V_p}\right)^2 \left(\frac{x - x_1}{y_1}\right)^2\right].$$

When the SAR moves along its flight path $\tau'_1$ varies with x, and a spatial fast doppler fluctuation is produced. Its frequency, $f_{d1}$, is proportional to the relative velocity of the target with respect to the first SAR, $V_{rel/1}$ (fast relative velocity of target 1), and is given by $$f_{d1} = \frac{2}{\lambda} \frac{V_{rel/1}}{V_p}.$$

The parameter $\lambda$ is the transmit signal wavelength. In terms of $f_{d1}$ and $f_{r1}$ the IF output signal can be expressed as $$p(x,t') \sim \begin{cases} e^{j2\pi f_{d1} x} \cdot e^{j2\pi f_{r1} t'}; 0 \leq t' < T \\ 0; \text{otherwise} \end{cases}$$

The first term is the fast doppler fluctuation. This expression is the IF output signal from a conventional SAR.

Figure 3:
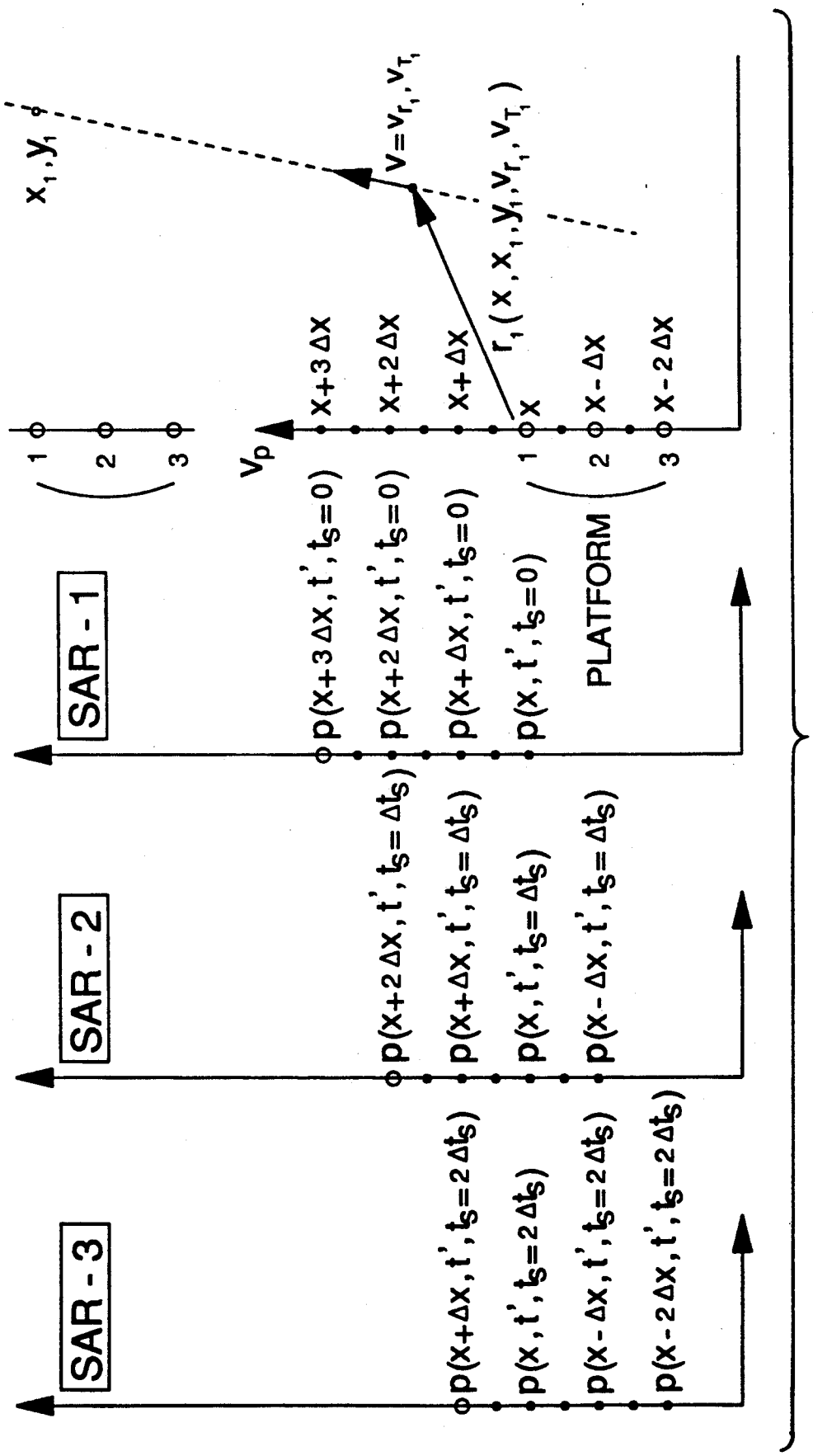
FIG. 3 shows the mathematical representation of a moving target SAR data set being generated as multiple SARs move along a straight line path.

Recall that, for this discussion, three SARs are transported by a moving platform (aircraft) 8 along the x-axis at a velocity $V_p$ (See FIG. 1). The SARs are arranged in a straight line along the x-axis and are separated from each other by a distance $\Delta x$, which is an integral multiple of $\Delta x'$. FIG. 3 shows a mathematical representation of a moving target SAR data set being generated as multiple SARs move along a straight line path. The target in our example travels a straight line trajectory with velocity components ($V_{r1}$, $V_{T1}$) and is broadside to the first SAR at coordinates ($x_1$, $y_1$). All three SARs simultaneously transmit a frequency modulated pulse every $\Delta x'$ meters of travel as the platform moves quasi-statically along the x-axis. Initially, the first SAR is at position x, the second SAR is at position x$-\Delta x$, and the third SAR is at position x$-2\Delta x$. In order to distinguish the IF output of one SAR from another SAR we introduce the variable $t_s$, which is called subaperture time. This variable takes on the value zero for the first SAR, $\Delta t_s$ for the second SAR, and 2$\Delta t_s$ for the third SAR. Thus, the IF outputs from the first through third SARs, when the first SAR is at position x, can be expressed as p(x,t',$t_s$=0), p(x$-\Delta x$,t',$t_s$=$\Delta t_s$), and p(x$-2\Delta x$,t',$t_s$=2$\Delta t_s$), respectively. After the platform moves a distance $\Delta x'$ the IF outputs become p(x+$\Delta x'$,t',$t_s$=0), p(x$-\Delta x'$,t',$t_s$=$\Delta t_s$), and p(x$-3\Delta x'$,t',$t_s$=2$\Delta t_s$), respectively. Note that $\Delta x$ was chosen to be 2$\Delta x'$ for concept explanation. Again the platform moves a distance $\Delta x'$ and this time the IF outputs become p(x+$\Delta x'$,t',$t_s$=0), p(x,t',$t_s$=$\Delta t_s$), and p(x$-\Delta x'$,t',$t_s$=2$\Delta t_s$), respectively. In two more distance steps all three SARs will have passed through position x. The stacked data associated with position x, p(x,t',$t_s$=0), p(x,t',$t_s$=$\Delta t_s$), and p(x,t',$t_s$=2$\Delta t_s$), can be thought of as the IF output from a stationary radar at position x. The stationary radar observes the moving target every $\Delta t_s$ seconds or, equivalently, every $\Delta x/V_p$ seconds, and outputs the slow doppler fluctuation resulting from the relative motion of the target with respect to position x. The frequency of the slow doppler fluctuation, $f_{s1}$, is directly proportional to the relative velocity of the target with respect to position x, $V_{rels1}$ (slow relative velocity of target 1). In mathematical terms $$f_{s1} \sim 2V_{rels1}/\lambda,$$

and $$V_{rels1} = V_{r1} - \left(1 - \frac{V_{T1}}{V_p}\right) V_{T1} \left(\frac{x - x_1}{y_1}\right).$$

The moving target SAR data set represents a three dimensional complex IF output signal, which can be expressed as $$p(x,t',t_s) \sim \begin{cases} e^{j2\pi f_{d1}x} \cdot e^{j2\pi f_{r1}t'} \cdot e^{j2\pi f_{s1}t_s}; & 0 \leq t' < T, 0 \leq t_s < T_s \\ 0; & \text{otherwise} \end{cases}$$

Here, $$T_s = M \Delta t_s,$$

and M is the number of SARs employed. The third term is the slow doppler fluctuation. Note that we have just generalized the present example to M SARs. When N targets are present, this equation is further generalized by simply replacing the subscript 1 with i, and then by summing from i=1, N, resulting in $$p(x,t',t_s) \sim$$

$$\begin{cases} \sum_{i=1}^{N} e^{j2\pi f_{d_i}x} \cdot e^{j2\pi f_{r_i}t'} \cdot e^{j2\pi f_{s_i}t_s}; & 0 \leq t' < T, 0 \leq t_s < T_s \\ 0; \text{ otherwise} \end{cases}$$

Data Processing and Imaging

Now we are ready to discuss how moving targets, defined by their respective coordinates $[x_i, y_i, V_{T_i}, V_{r_i};$ i=1, N], are located and brought to a focus in image space.

Figure 4:
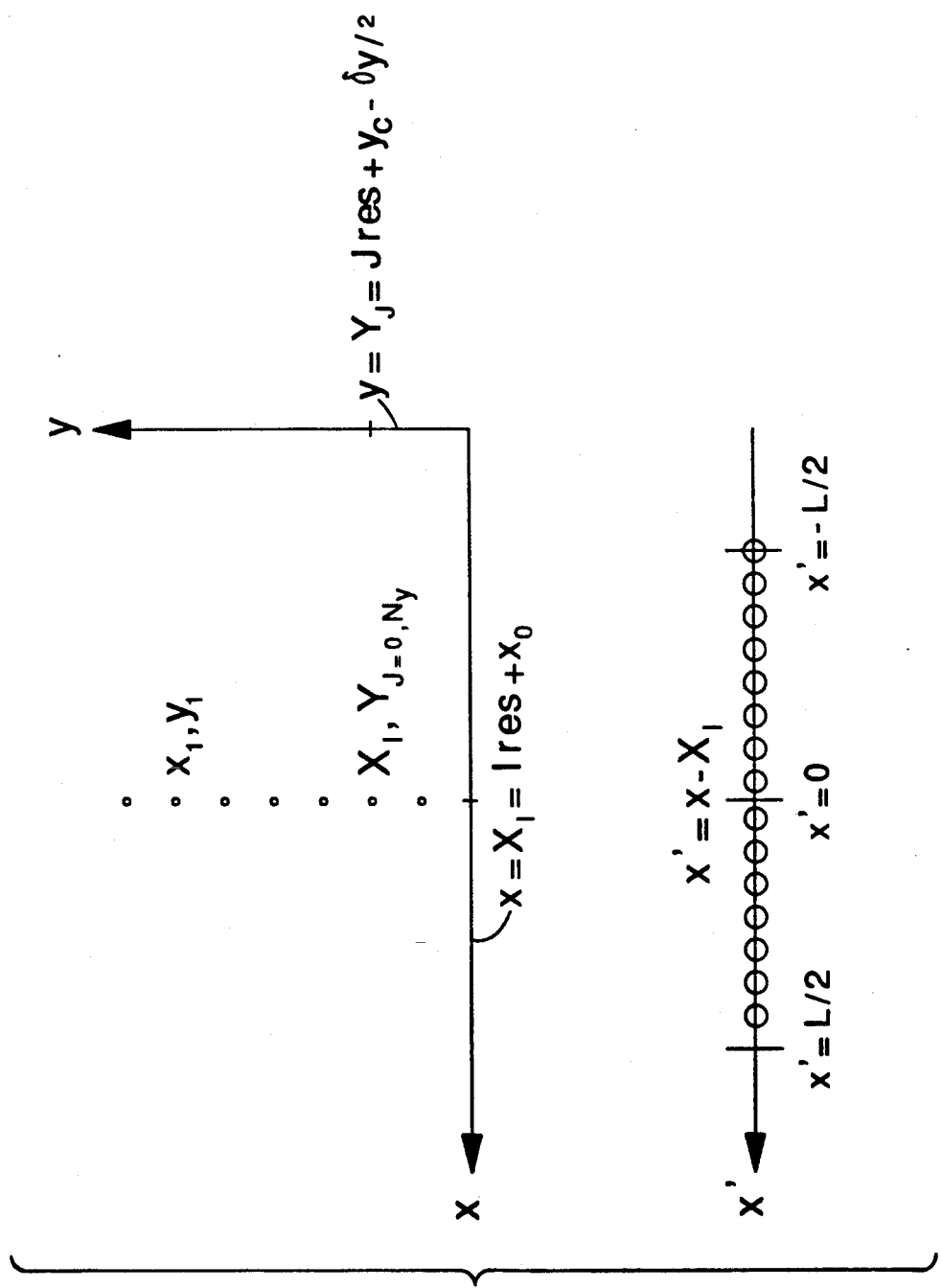
FIG. 4 shows a slant plane engagement geometry according to an aspect of the invention.

Consider the slant plane engagement geometry shown in FIG. 4. Initially, we desire only to locate and focus moving targets along the crosstrack image line defined at the image points $(X_I, Y_J; J=0,N_y)$. The image points are given by $$X_I = I \text{res} + x_0,$$

and $$Y_J = J \text{res} + y_c - \frac{\delta_y}{2}.$$

Notably, both I and J are integers, and $x_0$ is some arbitrary initial downtrack position. The integer $N_y$ is given by $$N_y = \text{INT}(\delta_y/\text{res}),$$

and the INT function rounds down its argument to the nearest integer.

In order to locate and focus moving targets along the image line at $x=X_I$, the multi-SAR platform must collect data over a distance equal to one synthetic aperture length L, say from $$X_I - \frac{L}{2} \text{ to } X_I + \frac{L}{2}.$$

The synthetic aperture length is given by $$L \sim \lambda y_c / 2\text{res}.$$

It is useful to define an adjusted downtrack position, $$x' = x - X_I,$$

so that any image line (I=0,1,2,...) will always occur at $x'=0$, and be independent of adjusted downtrack position. FIG. 4 shows the (sliding) downtrack x'-axis. This axis ranges from $$-\frac{L}{2} \text{ to } \frac{L}{2}$$

and is centered at $x'=0$. Signal transmissions occur at positions $$x'_k = -\frac{L}{2} + (k-1)\Delta x'; k = 1, N_L.$$

Here, $$N_L = \text{INT}\left(\frac{L}{\Delta x'}\right) + 1.$$

Typically, $x'=0$ does not coincide with a signal transmission position. In terms of x', the data collected can be expressed as $$p(x',t',t_s) \sim \sum_{i=1}^{N} e^{j\frac{-4\pi}{\lambda} r_i} \cdot e^{j2\pi f_{r_i}t'} \cdot e^{j2\pi f_{s_i}t_s};$$

$$0 \leq t' < T, 0 \leq t_s < T_s, -\frac{L}{2} \leq x' < \frac{L}{2}.$$

Here, $$r_i = (y_i - y_c) + (x' - x_i + X_I) \left[\left(\frac{V_{r_i}}{V_p}\right) + \left(\frac{1}{2}\right)\left(1 - \frac{V_{T_i}}{V_p}\right)^2 \left(\frac{x' - x_i + X_I}{y_i}\right) - \left(\frac{1}{2}\right)\left(\frac{V_{r_i}}{V_p}\right)\left(1 - \frac{V_{T_i}}{V_p}\right)^2 \left(\frac{x' - x_i + X_I}{y_i}\right)^2\right],$$

and $$V_{relsi} = V_{r_i} - \left(1 - \frac{V_{T_i}}{V_p}\right) V_{T_i} \left(\frac{x' - x_i + X_I}{y_i}\right).$$

Figure 5:
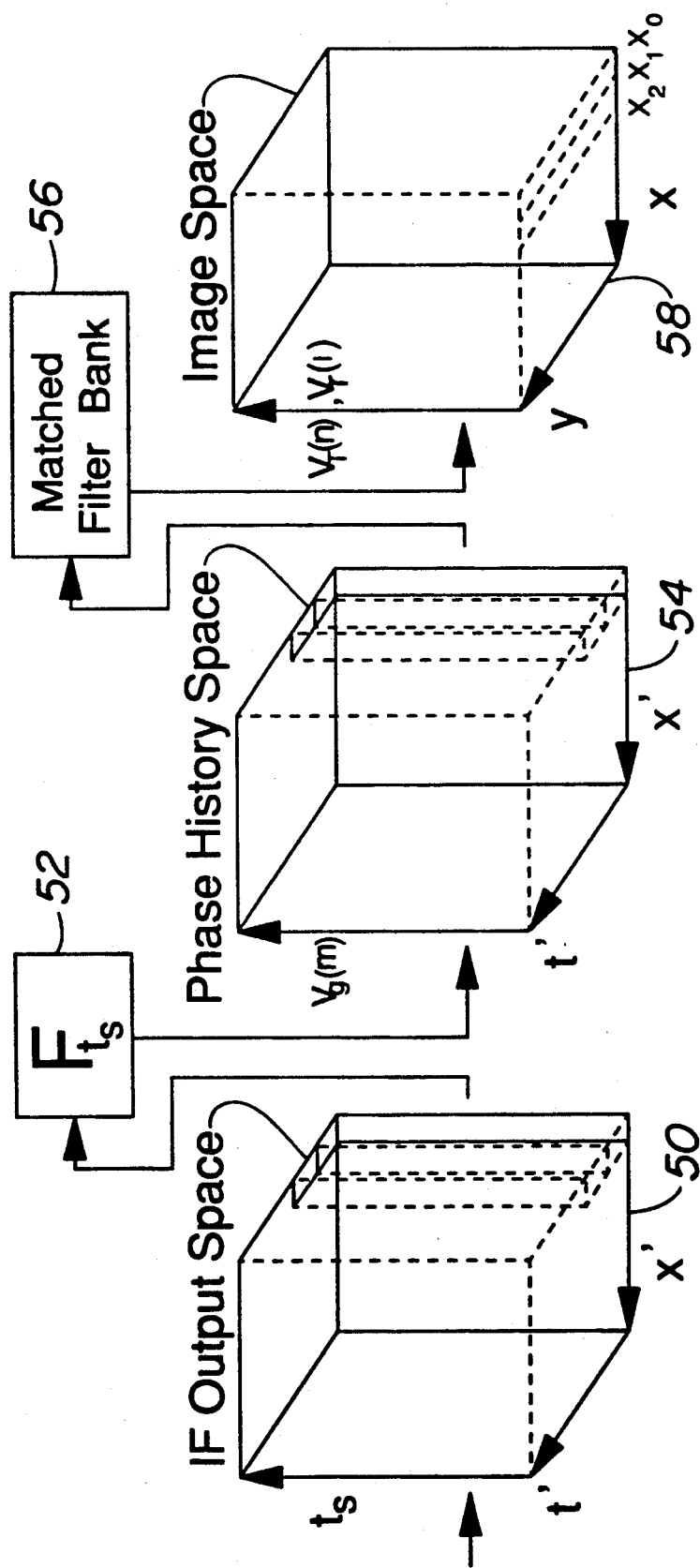
FIG. 5 shows an oblique pictorial representation of the IF output processing used to form images according to an aspect of the present invention.

The samples of $p(x',t',t_s)$ define IF output space, which is represented by the first box 50 in FIG. 5, and the product of the first two terms in $p(x',t',t_s)$ is the ith target's phase history.

The first processing step involves taking the Fourier transform of the IF output signal (or space) with respect to subaperture time represented by box 52. In this way, moving targets, in terms of phase history, are separated into M distinct slow relative velocity, $V_g(m)$, planes. Here, $$V_g(m) = \begin{cases} mV_{res}; & m = 0, \frac{M}{2} - 1 \\ (m - M)V_{res}; & m = -\frac{M}{2}, M - 1 \end{cases}$$

and $V_{res}$ is the required slow relative velocity resolution. As an example, consider an IF output signal due only to the moving target at coordinates $(x_1,y_1,V_{T1},V_{r1})$. After the first processing step an attenuated phase history, $$ph_1(x',t',V_g(m)) \sim$$

$$\frac{\sin\pi\left(\frac{V_g(m) - V_{rels1}}{V_{res}}\right)}{\pi\left(\frac{V_g(m) - V_{rels1}}{V_{res}}\right)} \cdot e^{-j\pi\left(\frac{V_g(m) - V_{rels1}}{V_{res}}\right)} \cdot e^{j\frac{4\pi}{\lambda}r_1} \cdot e^{j2\pi f_{r_1}t'},$$

appears in each corresponding slow relative velocity plane $[V_g(m); m=0,M-1]$. A phase history peak will occur in the plane closest to the target's slow relative velocity. Thus, if $V_{rels1}$ is equal to or nearly equal to, say $V_g(m_1)$, then the phase history peak, $$ph_1(x',t',V_g(m_1)) \sim e^{j\frac{4\pi}{\lambda}r_1} \cdot e^{j\frac{2\pi}{T}\frac{r_1}{res}t'};$$

$$-\frac{L}{2} \le x' < \frac{L}{2}, 0 \le t' < T,$$

occurs in the $V_g(m_1)$ plane. For concept understanding it is best to think of a point target as having a slow relative velocity equal to one of those identifying a $V_g(m)$ plane, and as having a phase history only in that plane. When many targets are present phase histories are likely to occur in many different slow relative velocity planes. The $V_g(m)$ planes make up the slow relative velocity phase history space shown in FIG. 5 as box 54.

Moving point targets are located and focused in image space by applying matched filtering techniques, represented by box 56, to slow relative velocity phase history space.

Image space, box 58, is a four-dimensional space formed by stacking $M_T M_r$ image planes. An image plane is identified by the downtrack and crosstrack velocity pair $V_T(n)$, $V_r(l)$. All possible velocity pairings derive from the expressions $$V_T(n) = \begin{cases} nV_{res}; & n = 0, \frac{M_T}{2} - 1 \\ (n - M_T)V_{res}; & n = \frac{M_T}{2}, M_T - 1 \end{cases}$$

and $$V_r(l) = \begin{cases} lV_{res}; & l = 0, \frac{M_r}{2} - 1 \\ (l - M_r)V_{res}; & l = \frac{M_r}{2}, M_r - 1 \end{cases}.$$

The integers $M_T$ and $M_r$ are related to the maximum downtrack target velocity, $V_{Tmax}$, and the maximum crosstrack target velocity, $V_{rmax}$. Specifically, $$M_T = 2V_{Tmax}/V_{res},$$

and $$M_r = 2V_{rmax}/V_{res}.$$

The velocity resolution, $V_{res}$, is chosen to be the same as that for slow relative velocity. Each image plane has a crosstrack y-axis and a downtrack x-axis. An image plane is formed from a succession of image lines, which are separated in the downtrack dimension by the spatial resolution distance res. Each line is formed from image points, which are separated in the crosstrack dimension also by the spatial resolution distance res. The last dimension is the image amplitude at an image point.

Two sets of complex reference functions are required for matched filtering. They are the range compression functions $$e^{-j\frac{2\pi}{T}\frac{r_{ref}}{res}t'}; 0 \le t' < T, -\frac{L}{2} \le x' < \frac{L}{2},$$

and the downtrack compression functions $$e^{-j\frac{4\pi}{\lambda}r_{ref}}; -\frac{L}{2} \le x' < \frac{L}{2}.$$

Note that $$r_{ref} \sim (Y_J - y_c) + (x - X_I)\left[\frac{V_r(l)}{V_p} + \right.$$

$$\left(\frac{1}{2}\right)\left(1 - \frac{V_T(n)}{V_p}\right)^2 \left(\frac{x - X_I}{y_c}\right) -$$

$$\left.\left(\frac{1}{2}\right)\left(\frac{V_r(l)}{V_p}\right)\left(1 - \frac{V_T(n)}{V_p}\right)^2 \left(\frac{x - X_I}{y_c}\right)^2\right];$$

$$J = 0, N_y; l = 1, M_r; n = 1, M_T; X_I - \frac{L}{2} \le x < X_I + \frac{L}{2}$$

or $$r_{ref} \sim (Y_J - y_c) + x'\left[\frac{V_r(l)}{V_p} + \right.$$

$$\left(\frac{1}{2}\right)\left(1 - \frac{V_T(n)}{V_p}\right)^2 \left(\frac{x'}{y_c}\right) -$$

-continued $$\left(\frac{1}{2}\right)\left(\frac{V_r(l)}{V_p}\right)\left(1 - \frac{V_T(n)}{V_p}\right)^2 \left(\frac{x'}{y_c}\right)^2\right];$$

$$J = 0, N_y; \ l = 1, M_r; \ n = 1, M_T; \ -\frac{L}{2} \leq x' < \frac{L}{2}.$$

The function set $r'_{ref}$ is the function set of adjusted ranges from the first SAR, at position x or x'

$$\left(x' = -\frac{L}{2}, \frac{L}{2}\right).$$

to each image point $(X_J, Y_J, V_T(n), V_r(l))$ making up the image line at $x = X_J$ or $x' = 0$ and $y = Y_J$, $J = 0, N_y$, in each image plane $V_T(n=1, M_T)$, $V_r(l=1, M_r)$. Therefore, each range and downtrack compression function is associated with a specific point $(X_J, Y_J, V_T(n), V_r(l))$ in image space, as is each target. Recall that we associated the ith target with the image space coordinates $(x_i, y_i, V_{Ti}, V_{ri})$. These coordinates define the target in terms of location when it is broadside of the first SAR and in terms of velocity components.

Return now to slow relative velocity phase history space and again consider the phase history, $ph_1(x',t',V_g(m_1))$, associated with the target at coordinates $(x_1, y_1, V_{T1}, V_{r1})$. This phase history is used to show how a target is located and focused in image space. For ease of explanation, suppose that the target's coordinates coincide with the image coordinates $[X_J, Y_{J1}, V_T(n_1), V_r(l_1)]$. If the target's phase history is multiplied by a series of range compression functions and the products are each averaged over adjusted fast time, then the target's fast doppler fluctuation, $FDC_1(x')$, is recovered unattenuated and undistorted only for the range compression function corresponding to the image coordinates $[X_J, Y_{J1}, V_T(n_1), V_r(l_1)]$. In mathematical terms, $$FDC_1(x') \sim <ph_1(x',t',V_g(m_1)) \cdot e^{-j\frac{2\pi}{T}\frac{r'_{ref}}{res}t'}>_{t'}$$
$$\sim <e^{j2\pi\frac{(r'_1-r'_{ref})}{res}\frac{t'}{T}}>_{t'} e^{j\frac{4\pi}{\lambda}r'_1}$$
$$\sim e^{j\frac{4\pi}{\lambda}r'_1}$$

at coordinates $[X_J, Y_{J1}, V_T(n_1), V_r(l_1)]$. The brackets, $<>$, denote adjusted fast time average. All possible fast doppler fluctuations, $\{FDC_1(x')\}$, corresponding to each range compression function tried, are then multiplied by the corresponding downtrack compression functions, and the products are each averaged over one synthetic aperture length. The magnitudes of the resulting complex numbers are recovered as image amplitudes, $\{H_1\}$, and are assigned to the corresponding image coordinates. The brackets $\{\}$, denote set. In mathematical terms $$\{H_1\} = \frac{1}{N_L} \left| \sum_{k=1}^{N_L} \{FDC_1(x'_k)\} e^{-j\frac{4\pi}{\lambda}r'_{ref}(x'_k)} \right|$$

The target image amplitude peaks, with unity value, at coordinates $[X_J, Y_{J1}, V_T(n_1), V_r(l_1)]$ in image space, and is attenuated at all other image points.

Image formation is an ongoing process, and only a single image line at a time is formed in each of the $M_T M_r$ image planes. To this point, we have considered only the image line at $x = X_J(I=0)$ or $x' = 0$. The next image line is formed only after the platform moves an additional number of $\Delta x'$ steps, say $k_0$. This motion corresponds to shifting the x'-axis $k_0$ transmission positions to the left in FIG. 4. Since the spacing between adjacent image lines is the spatial resolution, res is set equal to $k_0 \Delta x'$. The new image line is formed at $x = X_J(I=1)$ or $x' = 0$, by applying the same processing steps, described earlier, to the IF output space updated for the most recent $N_L$ transmissions.

Additional image lines are formed as the multi-SAR platform moves along the downtrack axis. Eventually, the image space encompasses the entire path of length $\delta_x$ (See FIGS. 1 and 5.).

Design Equations

In order to build a complex radar/IF processor which implements the concept, system design equations are required. These equations are presented, but are not derived. A number of the derivations involve satisfying the Nyquist sampling criteria with respect to fast doppler fluctuation, range fluctuation, and slow doppler fluctuation.

Engagement geometry parameters are defined and design equations follow according to application.

Engagement Geometry Parameters $V_p$—platform velocity
$V_{Tmax}$—maximum downtrack target velocity
$V_{rmax}$—maximum crosstrack target velocity
$V_{relsmax}$—maximum slow relative velocity; $V_{relsmax} \sim V_{rmax} + V_{Tmax} \sin \phi$; see antenna section for $\phi = \phi_1$ or $\phi_2$; see platform section for M
$V_{relsmax}$—maximum fast relative velocity; $V_{relfmax} \sim V_{rmax} + (V_p + V_{Tmax}) \sin \phi$
$K_V$—ratio of maximum fast to maximum slow relative velocities rounded up to nearest integer;

$$K_V = INT\left(\frac{V_{relfmax}}{V_{relsmax}} + 1.0\right)$$

$V_{res}$—velocity resolution
$\delta_y$—image patch width
$Y_c$—crosstrack distance to image patch center
res—spatial resolution; res=$k_0 \Delta x'$; $k_0$ is an integer greater than or equal to 2, and see IF processor section for $\Delta x'$

Complex Radar Equations

Transmitter/Receiver
$\lambda$—transmit signal wavelength
$\tau_D$—time delay; $\tau_D = 2y_c/c$; c is the speed of light
$\Delta F$—transmit signal peak frequency deviation; $\Delta F = c/2$res
$T_p$—transmit signal pulse period; $T_p = \Delta x'/V_p$; see IF processor section for $\Delta x'$
$\tau_D(m)$—time delay; $\tau_D(m) = (M-m)K_v T_p$; see platform section for M
T—transmit signal pulse width; $T < \min(\tau_D, T_p - \tau_D)$
Antennas $D_1$—aperture length for embodiment No. 1; $D_1 < \Delta x$; see platform section for $\Delta x$ $2\phi_1$—beam width for embodiment No. 1; $2\phi_1 = \lambda/D_1$ $D_2$—transmit antenna aperture length for embodiment No. 2; $D_2 \leq 2\text{res}$ $2\phi_2$—transmit antenna beam width for embodiment No. 2; $2\phi_2 = \lambda/D_2$ $D'_2$—receive antenna aperture length for embodiment No. 2; $D'_2 < \Delta x$; see platform section for $\Delta x$ $2\phi'_2$—receive antenna beam width for embodiment No. 2; $2\phi'_2 = \lambda/D'_2$ Platform M—number of SARs or antennas; $M = 2V_{relsmax}/V_{res}$; M is an even integer $\Delta x$—distance between SARs or antennas; $\Delta x = (\lambda/4)(V_p/V_{relsmax})$ $\Delta X_T$—downtrack distance to transmit antenna for embodiment No. 2;

$$\Delta X_T = \left(\frac{M-1}{2}\right)\Delta x$$

d—crosstrack distance to transmit antenna for embodiment No. 2;

$$d = INT\left[\frac{D'_2 + D_2}{2\Delta x} + 1.0\right]\Delta x$$

l—platform length; $l = M\Delta x$

IF Processor Equations $\Delta t_s$—subaperture time sample spacing; $\Delta t_s = \lambda/4V_{relsmax}$ $T_s$—subaperture time record length; $T_s = M\Delta t_s$ $\Delta x'$—downtrack sample spacing; $\Delta x' = \Delta x/K_V$ L—synthetic aperture length; $L \sim \lambda y_c/2\text{res}$ $N_L$—number of downtrack samples (over L); $N_L = INT(L/\Delta x') + 1$ K—number of adjusted fast time samples (over T);

$$K = \left[\delta_y + L\left(\frac{V_{rmax}}{V_p}\right)\right]/\text{res};$$

K is an even integer $\Delta t'$—adjusted fast time sample spacing; $\Delta t' = T/K$ $N_y + 1$—number of image points in crosstrack dimension; $N_y = INT(\delta_y/\text{res})$ $T'_p$—image line formation time period; $T'_p = k_0 T_p$; see definition of res $\Delta t$—fast doppler sample processing time; $\Delta t = (T'_p - T_p + T)/N_L$ $r'_{ref}$—see text for range and downtrack compression functions

Embodiments

Two preferred embodiments of the system design, which includes a complex radar and an IF processor, are shown in FIGS. 6–10.

Embodiment No. 1

Complex Radar

Figure 6:
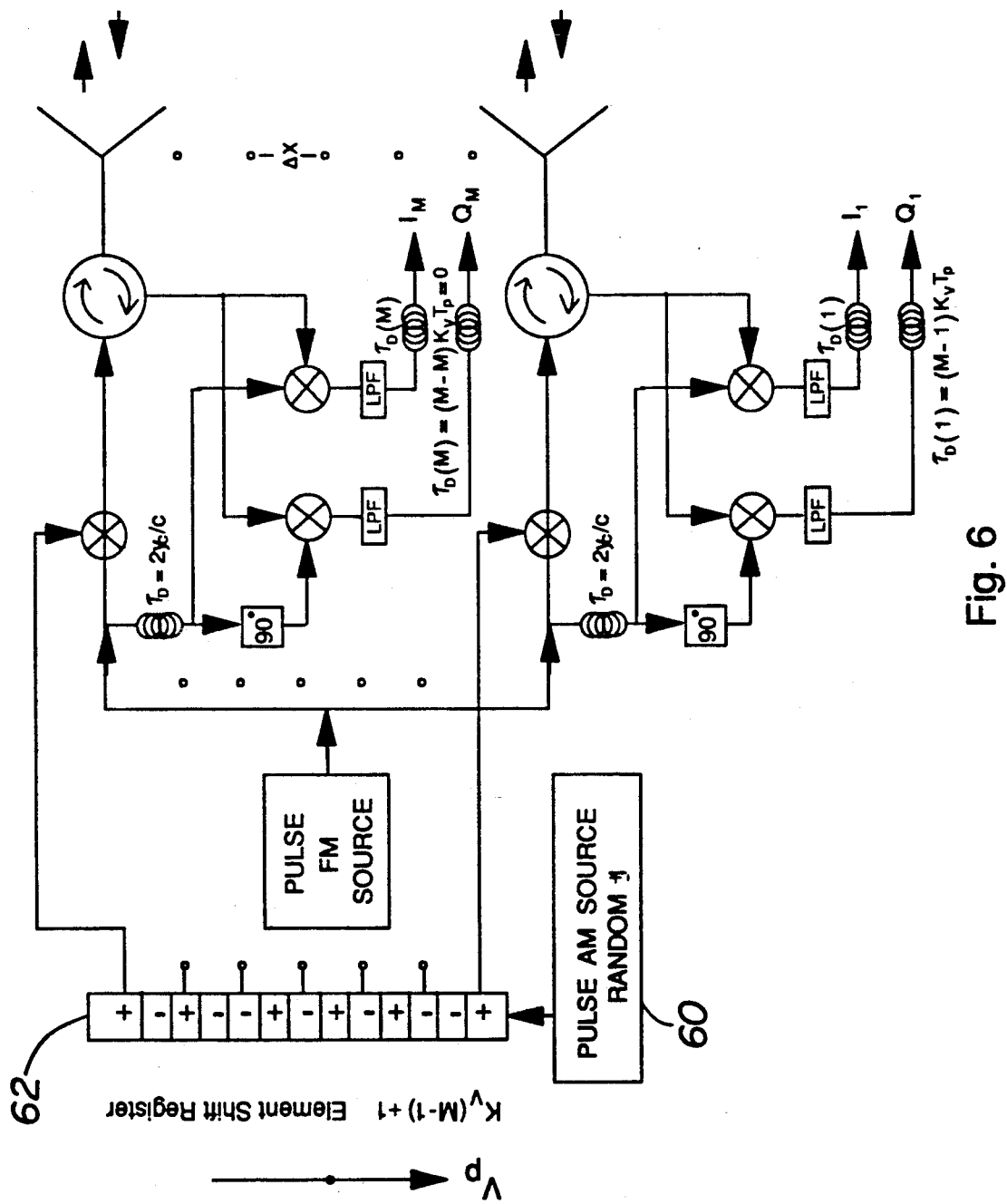
FIG. 6 shows a schematic diagram of a complex radar using a plurality of SARs for implementating the present invention according to an aspect of the present invention.

FIG. 6 shows a complex radar according to the present invention that builds upon the conventional SAR design shown in FIG. 2a. Instead of a single radar there are now M radars, with each radar antenna separated from its neighbor by a distance $\Delta x$. In addition, random pulse amplitude modulation (PAM) 60 is now used to encode each string of transmitted frequency modulated (FM) pulses. There is one string of pulses per radar. Each pulse in a string is multiplied by either +1 or −1, with equal probability. Thus, a string of pulses is bi-phase coded. There are M such strings of pulses. The bi-phase coding is identical for each string and is shifted by $K_y$ (See Design Equations.) pulse periods per string as we transition from the first through the Mth radar. This shift occurs, because of our use of a $[K_y(M-1)+1]$-element shift register. Note that there are $(K_y-1)$ shift register elements between adjacent ports. Each of the M strings are produced by the complex radar, which generates them by simultaneously transmitting M coded pulses at a time. That is, one pulse for each radar. Proceeding further, the string bi-phase coding along with the IF processor decoding and downtrack averaging (FIG. 7) simulates the desirable effect that a return pulse will produce an IF pulse only at the output of the radar from which it was transmitted. This effect occurs, because in the downtrack dimension the bi-phase code on an unlike return is shifted with respect to that on a like return, and therefore these returns are uncorrelated. Note that earlier on we ignored the effect of unlike returns. Last, the M IF output pulses, which result when each radar passes through the same downtrack position, say x, in terms of their real and imaginary parts, are represented by $[(I_1, Q_1), \ldots, (I_M, Q_M)]$ in FIG. 6. Each IF output pulse corresponds to a different subaperture time $[0, \Delta t_s, \ldots, (M-1)\Delta t_s]$, and is a continuous function of fast time.

IF Processor

Figure 7A:
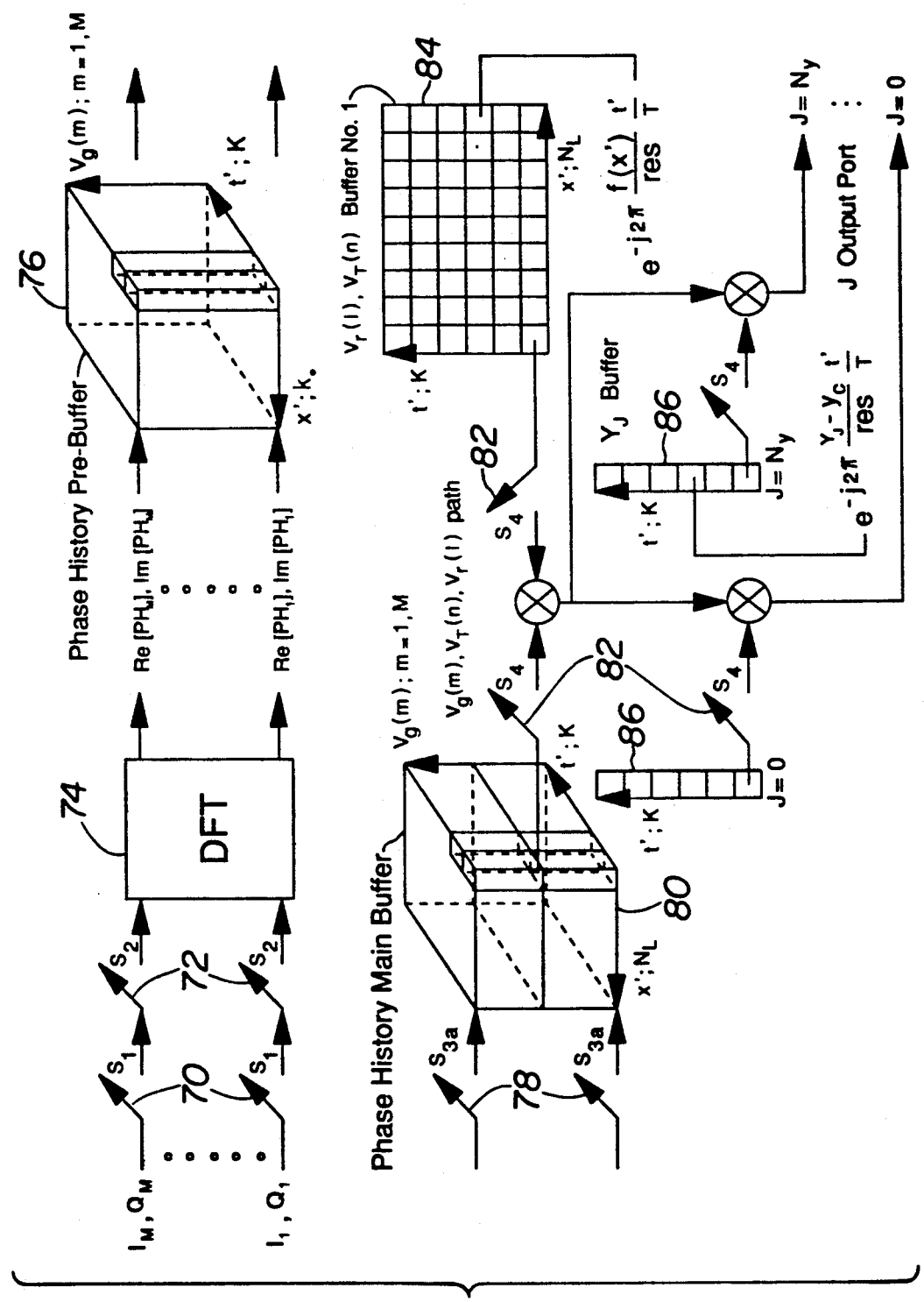
FIG. 7a shows a schematic diagram of an IF processor for implementating the present invention according to the complex radar shown in FIG. 6.
Figure 7B:
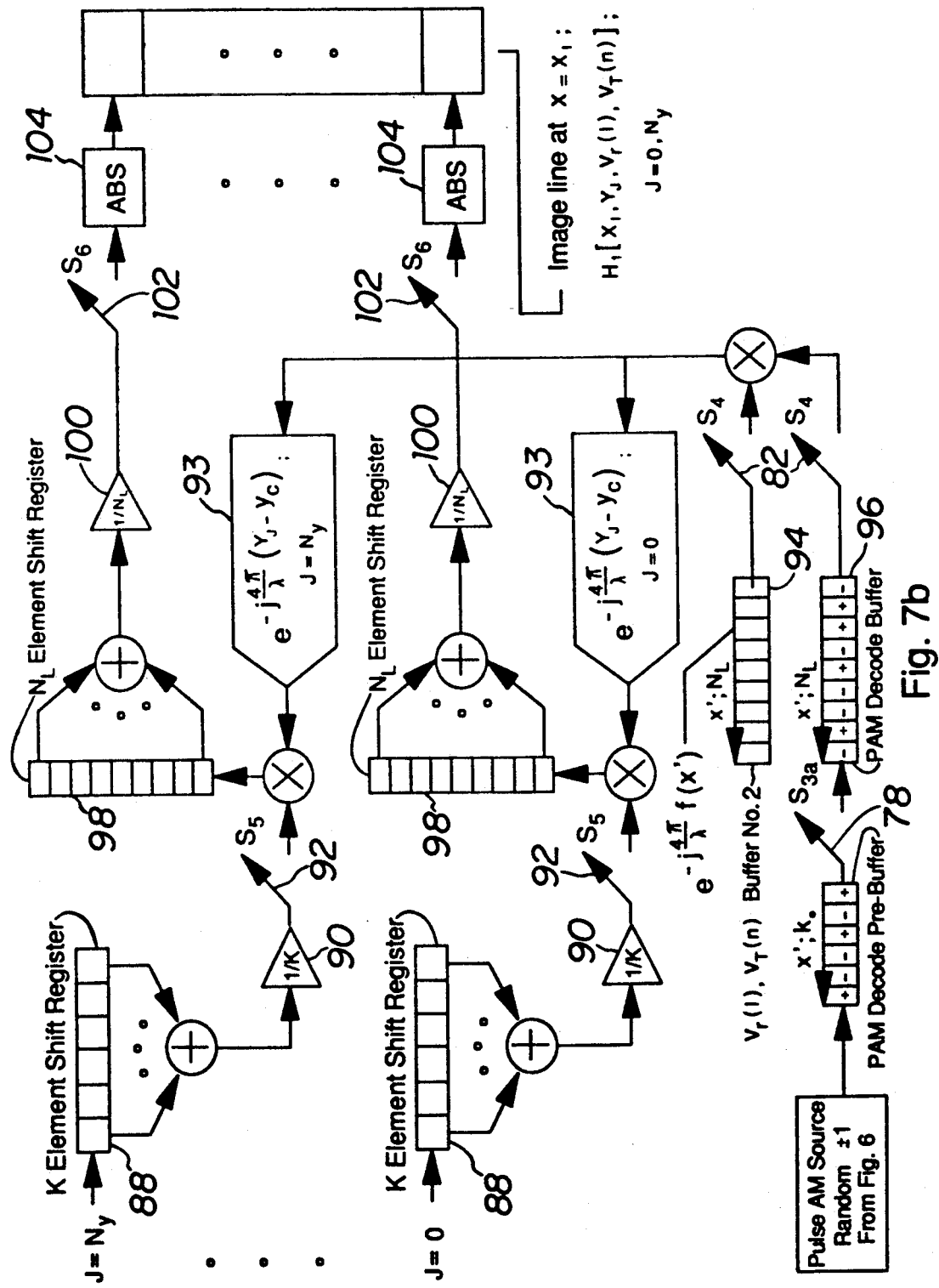

Refer now to FIGS. 7a, 7b and 8. Switches 70, $S_1$ and 72, $S_2$ convert each IF output pulse to a K-sample discrete-adjusted fast time signal. There are M such complex signals. The set of IF output samples, one from each of the M signals, at the same adjusted fast time, say t', comprises a discrete-subaperture time signal or column vector $[(I_M, Q_M), \ldots, (I_1, Q_1)]^T$. (Here the symbol T denotes transpose.) Using the discrete Fourier transform 74 this column vector is transformed into a phase history column vector $[(R_e[PH_M], I_M[PH_M]), \ldots, (R_e[PH_1], I_M[PH_1])]^T$, which is stored at position (x', t') in the phase history pre-buffer 76. One row of the pre-buffer at a time, corresponding to each x', is filled with K phase history column vectors. The last row is filled only after the $k_0$th set of return pulses is processed. There are M $k_0$th return pulses. The switching pulse shown in FIG. 8 under $S_2$, can be thought of as the $k_0$th return pulse due to one of the radars, and it is preceded by $(k_0 - 1)$ return pulses.

After the pre-buffer 76 is filled switch 78, $S_{3a}$ is closed and the phase history main buffer 80 is updated over $(T_p - T)$ seconds. Upon completion of this task switch 82, $S_4$ is engaged and the data stored in the phase history main buffer 80 is accessed over $[(T_p + T) + (k_0 - 2)T_p]$ seconds. During this time plus an additional $$\frac{\Delta t}{2}$$

seconds all calculations required to produce the image line at $x = X_I$ are undertaken.

Consider the processing path identified by the velocity set $[V_g(m), V_T(n), V_r(l)]$. It is one of $MM_TM_r$ possible paths. For most practical applications all processing paths are not required. Usually, slow relative velocity, $V_g$, is approximately equal to crosstrack velocity, $V_r$, over one synthetic aperture length, and therefore only $M_TM_r$ processing paths are required. These paths are identified by $[V_g(l)=V_r(l); l=0, M_r-1]$, and $[V_T(n); n=0, M_T31\ 1]$. The mathematical expression for $V_r(l)$ given earlier must be used here.

For the selected processing path, the data contained in the $m^{th}$ plane of the phase history main buffer 80 is accessed. Simultaneously, reference data, $$e^{-j2\pi \frac{f(x')}{res} \frac{t'}{T_r} ; f(x') - x' \left[ \frac{V_r(l)}{V_p} + \frac{1}{2}\left(1 - \frac{V_T(n)}{V_p}\right)^2 \frac{x'}{y_c}\left(1 - \frac{V_r(l)}{V_p}\frac{x'}{y_c}\right)\right]}$$

stored in the $V_r(l)$, $V_T(n)$ buffer #1 84, which will be referred to from hereon as BUF1, and the $Y_J$ buffers 86 are accessed. The phase history main buffer 80 and BUF1 84 are accessed one row at a time in the direction of increasing t' and then increasing x'. On the other hand, the $Y_J$ buffers 86 are single row and recycle in the direction of increasing t'. All of these buffers are synchronized with respect to (x', t') address as the indicated multiplications are undertaken.

For each x' row in BUF1 84, a K-sample discrete-adjusted fast time signal appears at each J output port. There are ($N_y+1$) such signals. These output signals, call them the encoded prefast doppler fluctuations at coordinates $[X_J, Y_J, V_T(n), V_r(l); J=0, N_y]$, must each be averaged over K samples. Referring now to FIG. 7b, averaging is accomplished by a K-element shift register 88, an amplifier 90 of gain 1/K, and a switch 92 designated by $S_5$. The single sample outputs from the $S_5$ switches, one for each J output port, are the encoded fast doppler fluctuations at coordinates $[X_J, Y_J, V_T(n), V_r(l); J=0, N_y]$ for row x' in BUF1 84. As additional x' rows are addressed in BUF1 84 a sequence of encoded fast doppler fluctuation samples, dependent on x' and J output port, appears at each 92 $S_5$ switch output. These sequences end up each being $N_L$ samples long after the last row in BUF1 84 is accessed. There are ($N_y+1$) such sequences.

Each encoded fast doppler fluctuation sequence (J=0, $N_y$) is multiplied by an appropriate gain factor 93, dependent on J output port, and successive samples in a sequence, in the direction of increasing x', are multiplied by the corresponding data stored in the $V_r(l)$, $V_T(n)$ buffer #2 94 and the PAM (pulse amplitude modulation) decode buffer 96. Each resulting $N_L$-sample sequence must be averaged over x'. Averaging is accomplished by an $N_L$-element shift register 98, an amplifier 100 of gain $1/N_L$, and a switch 102 designated by $S_6$. An image amplitude at coordinates $[X_J, Y_J, V_T(n), V_r(l)]$ results upon taking the absolute value 104 of the $S_6$ switch output for the J output port. The outputs from all $S_6$ switches produce an image line at coordinates $[X_J, Y_J, V_T(n), V_r(l); J=0, N_y]$. Additional image lines (I=0, 1, 2, ... ) are formed every $T'_p$ seconds.

Embodiment No. 2

Complex Radar

Figure 9:
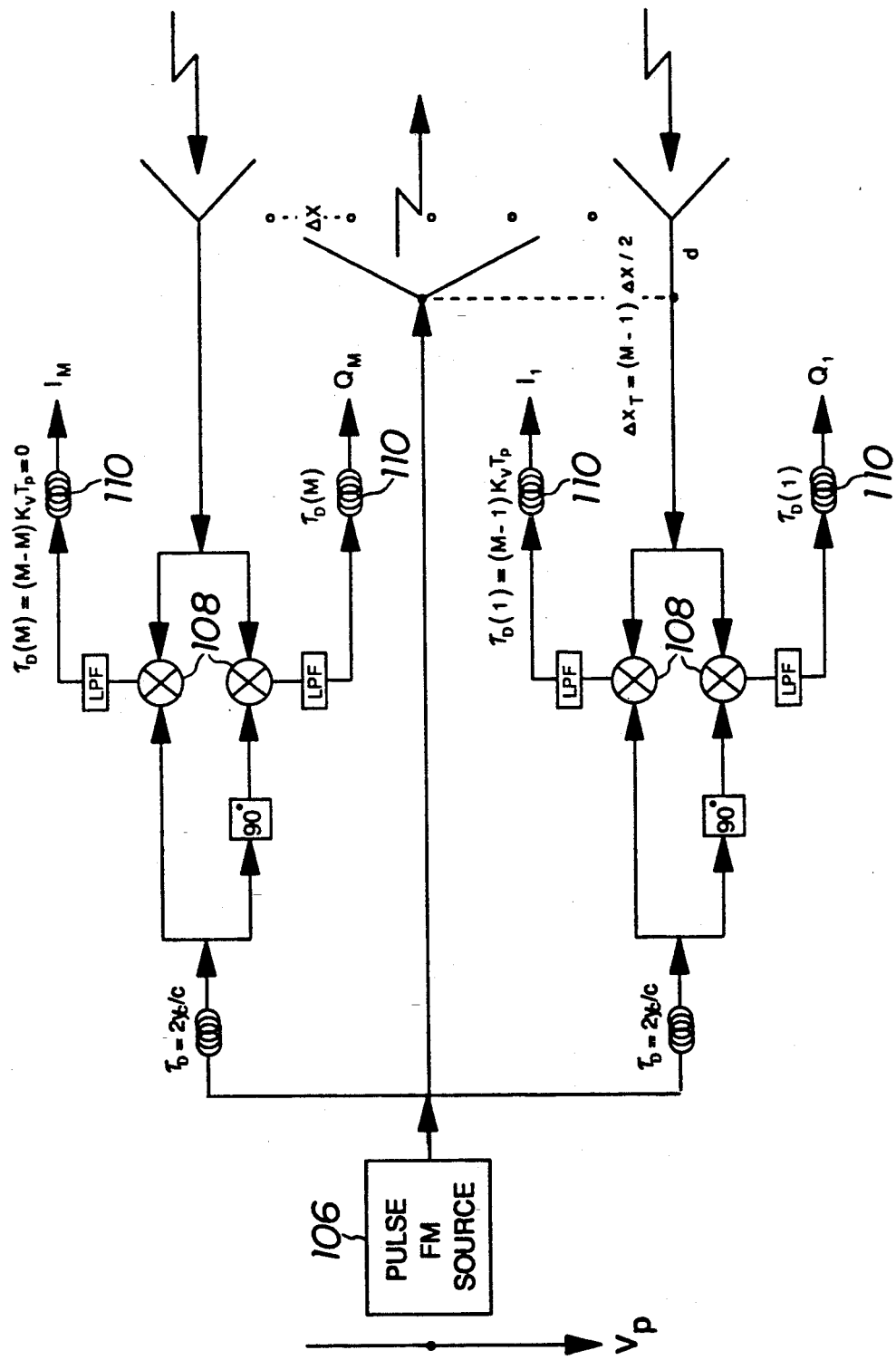
FIG. 9 shows a schematic diagram of a complex radar using a plurality of SARs for implementating the present invention according to another aspect of the present invention.

The complex radar in FIG. 9 employs a single transmit antenna and M receive antennas to simulate M independent SARs. A pulsed FM signal 106 is transmitted every $\Delta x'$ meters of travel and the return signal at each receive antenna is recovered through the use of quadrature mixers 108. Further, receive channel delays 110 $[\tau_D(m); m=1, M]$ are employed to insure that the M IF output pulses, which result when each receive antenna passes through the same downtrack position, say x, occur at the same time. These IF output pulses, in terms of their real and imaginary parts, are represented by $[(I_1, Q_1), \ldots, (I_M, Q_M)]$ in FIG. 9. Each IF output pulse corresponds to a different subaperture time $[0, \Delta t_s, \ldots, (M-1)\Delta t_s]$, and is a continuous function of fast time. Notably, phase corrections must be made to each of the M IF output pulses in order for them to be truly representative of a complex radar with M independent SARs. These corrections are made by the IF processor.

IF Processor

Figure 10:
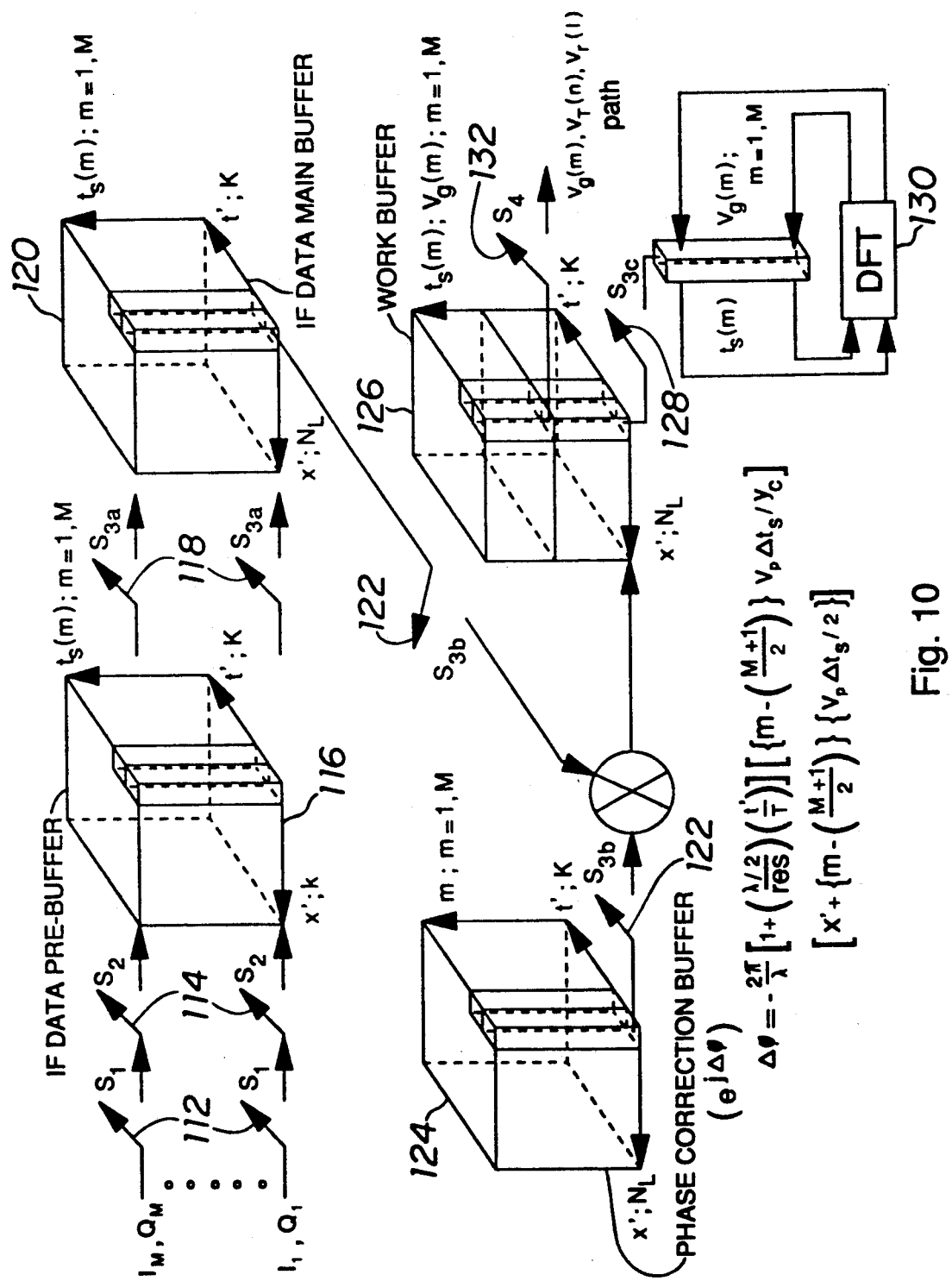
FIG. 10 shows a schematic diagram of an IF processor for implementating the present invention according to the complex radar shown in FIG. 9.

Refer now to FIGS. 10 and 8. Switches 112, $S_1$ and 114, $S_2$ convert each IF output pulse to a K-sample discrete-adjusted fast time signal. There are M such complex signals. The set of IF output samples, one from each of the M signals, at the same adjusted fast time, say t', comprises a discrete-subaperture time signal or column vector $[(I_M, Q_M), \ldots, (I_1, Q_1)]^T$. This column vector is stored at position (x', t') in the IF data pre-buffer 116. One row of the pre-buffer at a time, corresponding to each x', is filled with K column vectors. The last row is filled only after the $k_0$th set of return pulses is processed.

After the pre-buffer 116 is filled switch 118, $S_{3a}$ is closed and the IF data main buffer 120 is updated over $(T_p-T)/3$ seconds. Upon completion of this task switch 122, $S_{3b}$ is engaged, and the phase correction buffer 124 is accessed over the next $(T_p-T)/3$ seconds. During this time, the phase corrections, $$\Delta\phi = -\frac{2\pi}{\lambda}\left[1 + \left(\frac{\lambda/2}{res}\right)\left(\frac{t'}{T}\right)\right]\left\{\left(m - \left(\frac{M+1}{2}\right)\right)V_p\Delta t_s/y_c\right\}\left[x' + \left(m - \left(\frac{M+1}{2}\right)\right)\{V_p\Delta t_s/2\}\right],$$

stored in the phase correction buffer 124, are applied by corresponding address to the complex data points, stored in the IF data main buffer 120, and the resulting phase corrected complex data points are stored at the corresponding addresses in the work buffer 126. After the work buffer 126 is filled switch 128, $S_{3c}$ is closed and each IF data column vector in the work buffer 126 is converted to a phase history data column vector, through the use of the DFT (discrete Fourier transform) 130. The work buffer 126 is now identical to the phase history main buffer 80 displayed in FIG. 7a. The time allowed for this conversion is $(T_p-T)/3$ seconds. Note that additional time for the last three processes can be allotted, but only at the expense of a corresponding decrease in the time allotted for the post work buffer processing.

Switch 132, $S_4$ is now engaged and the phase history data stored in the work buffer 126 is accessed over $[(T_p+T)+(k_0-2)T_p]$ seconds. During this time plus an additional $\Delta t/2$ seconds all calculations required to produce the image line at $x=X_l$ are undertaken.

The remaining processing steps and explanation follow closely those presented for embodiment No. 1, and are not presented here. The reader is referred to FIG. 7a, starting with switch 82, $S_4$, and should ignore the decode buffer branch. Also, the reader is referred to the IF processor section for embodiment No. 1, starting with paragraph number 3. The word "encoded" should be ignored as well as the single reference to the PAM decode buffer.

Obviously, numerous modifications and variations of the present invention are possible in light of the above teachings. It is therefore to be understood that within the scope of the appended claims, the invention may be practiced otherwise than as specifically described herein.

We claim:

1. A method of imaging moving targets with an aircraft mounted radar system having a plurality of synthetic aperture radars (SARs) comprising the steps of:
   positioning said plurality of SARs at equal separation distance $\Delta x$ along the flight velocity vector $V_p$ of the aircraft,
   transmitting a plurality of modulated pulses from said radar system periodically, with period $T_p$, where $1/T_p$ is an integral multiple of $V_p/\Delta x$,
   generating a two dimensional complex IF output signal comprising fast time and downtrack position dimensions from return pulses received at a leading first SAR,
   generating additional two dimensional complex IF output signals, corresponding to each successive SAR, trailing said first SAR,
   sequentially stacking said two dimensional complex IF output signals to form a three dimensional complex data set or IF output space, whereas subaperture time is a third dimension, according substantially to the following criteria, $$p(x,t',t_s) \sim \begin{cases} \sum_{i=1}^{N} e^{j2\pi f_{d_i} t'} \cdot e^{j2\pi f_{r_i} t'} \cdot e^{j2\pi f_{s_i} t_s}; & 0 \leq t' < T, 0 \leq t_s < T_s \\ 0; & \text{otherwise} \end{cases}$$

wherein:
x is aircraft downtrack position (m),
$t'$ is adjusted fast time (secs),
$t_s$ is subaperture time (secs),
N is number of moving targets present,
$f_{d_i}$ is ith moving target fast doppler frequency,
$f_{r_i}$ is ith moving target range fluctuation frequency,
$f_{s_i}$ is ith moving target slow doppler frequency,
T is transmit signal pulse width (secs),
$T_s$ is subaperture time record length (secs), $$e^{j2\pi f_{d_i} t'}$$

is ith moving target fast doppler fluctuation, $$e^{j2\pi f_{r_i} t'}$$

is ith moving target range fluctuation, $$e^{j2\pi f_{s_i} t_s}$$

is ith moving target slow doppler fluctuation, $$e^{j2\pi f_{d_i} t'} \cdot e^{j2\pi f_{r_i} t'}$$

is ith moving target phase history,
whereby subaperture time, as an additional dimension in conjunction with downtrack position and adjusted fast time, provides a means to sort moving target phase histories by slow relative velocity.

2. The method of imaging moving targets as claimed in claim 1 further comprising the step of:
   taking a Fourier transform of IF output space with respect to subaperture time thereby sorting moving target phase histories by slow relative velocity.

3. The method of imaging moving targets as claimed in claim 2 further comprising the step of:
   processing said slow relative velocity sorted moving target phase histories to produce spatially and velocity resolved images.

4. The method of imaging moving targets as claimed in claim 1 wherein said plurality of SARs are independent and synchronized.

5. The method of imaging moving targets as claimed in claim 1 wherein said plurality of modulated pulses are transmitted simultaneously with said period $T_p$.

6. The method of imaging moving targets as claimed in claim 1 wherein said plurality of SARs are independent and synchronized, and said plurality of modulated pulses are transmitted simultaneously and periodically with said period $T_p$.

7. The method of imaging moving targets as claimed in claim 1 wherein said plurality of SARs are synchronized, and said plurality of modulated pulses, which are transmitted simultaneously and periodically with said period $T_p$, are in addition bi-phase coded in such a way that the bi-phase code in the downtrack position dimension on an unlike return is not correlated with the bi-phase code in the downtrack position dimension on a like return, and further includes the steps of IF processor bi-phase decoding and downtrack position averaging in order to simulate that a return pulse will produce an IF pulse only at the output of the SAR from which it was transmitted.

8. The method of imaging moving targets as claimed in claim 1 wherein transmitting a plurality of modulated pulses with said period $T_p$ occurs at a single transmit antenna, and further includes the steps of receiving return pulses at a plurality of receive antennas, converting said return pulses into IF output pulses, and applying phase corrections to said IF output pulses in order that they substantially approximate IF output pulses from a plurality of independent SARs.

9. A method of imaging moving targets with an aircraft mounted radar system having a plurality of synthetic aperture radars (SARs) comprising the steps of:
   positioning said plurality of SARs at equal separation distance $\Delta x$ along the flight velocity vector $V_p$ of the aircraft, transmitting a plurality of modulated pulses from said radar system periodically, with period $T_p$, where $1/T_p$ is an integral multiple of $V_p/\Delta x$, generating a two dimensional complex IF output signal comprising fast time and downtrack position dimensions from return pulses received at a leading first SAR, generating additional two dimensional complex IF output signals, corresponding to each successive SAR, trailing said first SAR, sequentially stacking said two dimensional complex IF output signals to form a three dimensional complex data set or IF output space, whereas subaperture time is a third dimension, according substantially to the following criteria, $p(x,t',t_s) \sim$ $$\left\{ \begin{array}{l} \sum_{i=1}^{N} e^{j2\pi f_{d_i} t'} \cdot e^{j2\pi f_{r_i} t'} \cdot e^{j2\pi f_{s_i} t_s}; \ 0 \leq t' < T, \ 0 \leq t_s < T_s \\ 0; \ \text{otherwise} \end{array} \right\}$$

wherein:
x is aircraft downtrack position (m),
t' is adjusted fast time (secs),
$t_s$ is subaperture time (secs),
N is number of moving targets present,
$f_{d_i}$ is ith moving target fast doppler frequency,
$f_{r_i}$ is ith moving target range fluctuation frequency,
$f_{s_i}$ is ith moving target slow doppler frequency,
T is transmit signal pulse width (secs),
$T_s$ is subaperture time record length (secs), $e^{j2\pi f_{d_i} t'}$ is ith moving target fast doppler fluctuation, $e^{j2\pi f_{r_i} t'}$ is ith moving target range fluctuation, $e^{j2\pi f_{s_i} t_s}$ is ith moving target slow doppler fluctuation, $e^{j2\pi f_{d_i} x} \cdot e^{j2\pi f_{r_i} t'}$ is ith moving target phase history, taking a Fourier transform of IF output space with respect to subaperture time thereby sorting moving target phase histories by slow relative velocity, processing said slow relative velocity sorted moving target phase histories using matched filtering techniques adjusted for both target crosstrack and downtrack velocity components to produce spatially and velocity resolved images.

10. The method of imaging moving targets as claimed in claim 9 wherein said plurality of SARs are independent and synchronized.

11. The method of imaging moving targets as claimed in claim 9 wherein said plurality of modulated pulses are transmitted simultaneously with said period $T_p$.

12. The method of imaging moving targets as claimed in claim 9 wherein said plurality of SARs are independent and synchronized, and said plurality of modulated pulses are transmitted simultaneously and periodically with said period $T_p$.

13. The method of imaging moving targets as claimed in claim 9 wherein said plurality of SARs are synchronized, and said plurality of modulated pulses, which are transmitted simultaneously and periodically with said period $T_p$, are in addition bi-phase coded in such a way that the bi-phase code in the downtrack position dimension on an unlike return is not correlated with the bi-phase code in the downtrack position dimension on a like return, and further includes the steps of IF processor bi-phase decoding and downtrack position averaging in order to simulate that a return pulse will produce an IF pulse only at the output of the SAR from which it was transmitted.

14. The method of imaging moving targets as claimed in claim 9 wherein transmitting a plurality of modulated pulses with said period $T_p$ occurs at a single transmit antenna, and further includes the steps of receiving return pulses at a plurality of receive antennas, converting said return pulses into IF output pulses, and applying phase corrections to said IF output pulses in order that they substantially approximate IF output pulses from a plurality of independent SARs.

* * * * *